United States Patent [19]
Ernst

[11] 4,034,688
[45] July 12, 1977

[54] DISC SCRAPING APPARATUS

[76] Inventor: Arnold E. Ernst, Wolverton, Minn. 56594

[21] Appl. No.: 634,614

[22] Filed: Nov. 24, 1975

[51] Int. Cl.² .......................................... A01C 5/00
[52] U.S. Cl. ...................................... 111/87; 111/1; 172/566
[58] Field of Search ................. 111/85, 84, 86, 87, 111/88, 89, 34, 65, 69, 1; 172/547, 558, 560, 561, 562, 563, 564, 565, 566, 168, 167, 166, 187

[56] References Cited

U.S. PATENT DOCUMENTS

| 624,117 | 5/1899 | Stephenson | 172/566 |
|---|---|---|---|
| 718,825 | 1/1903 | Davis | 172/561 X |
| 845,425 | 2/1907 | Livesay | 172/566 X |
| 1,203,156 | 10/1916 | Sturrock | 172/556 X |
| 1,204,306 | 11/1916 | Offerman | 172/566 X |
| 1,264,970 | 5/1918 | Pfeifer | 172/566 X |
| 3,886,875 | 6/1975 | Ernst | 111/85 |

Primary Examiner—Edgar S. Burr
Assistant Examiner—James R. Feyrer
Attorney, Agent, or Firm—Henderson, Strom & Sturm

[57] ABSTRACT

A disc scraping apparatus in combination with a disc assembly including a pair of elongated scraping blades having formed upon their lower portion a scraping edge and positioned between a pair of rotating discs. The scraping blades are held apart with the scraping edge positioned against the discs by a biasing unit which is positioned midway through their length. A bracket unit is pivotably fastened to the scraping blades and securely coupled to the planter apparatus and provides for positioning of the disc scraping apparatus in proper alignment with the discs.

2 Claims, 6 Drawing Figures

DISC SCRAPING APPARATUS

BACKGROUND OF THE INVENTION

The present invention relates in general to a scraping apparatus; and, in particular, to a scraping apparatus for use with the ground breaking disc on a seed planter of the type disclosed in U.S. Pat. No. 3,886,875 to Arnold E. Ernst.

During the wet planting season, often field planting is required when there is still considerable moisture within the top portion of the soil. While this condition is excellent for quick seed development, it often presents problems of caking and clogging of the farm machinery. This is particularly true for the planting equipment since the equipment often has close working tolerances and is very precise.

Presently, a common and very efficient type of planter is the Grain Drill, and of the type disclosed in U.S. Pat. No. 3,886,875 entitled Planter Apparatus to Arnold E. Ernst. The planter of this type works very well in solving many of the problems encountered with earlier types of grain drill planters. However, if the Ernst planter is used in soil where the moisture content is above average, often times the ground breaking disc will become caked with dirt and in time clogged, thereby necessitating the stopping of the planter and manually removing the caked-on dirt and debris from the disc. If this situation is not corrected, it is possible for the ground breaking disc to be forced apart and out of alignment, and improperly perform or discontinue entirely their purpose of breaking the ground and providing subsurface bed for the seed.

SUMMARY OF THE INVENTION

In accordance with the present invention, there is provided a pair of elongated scraping blades having a scraping edge formed on the bottom portion. The blades are positioned facing each other and between a pair of planting discs. The blades are held in place by a bracket unit which is rigidly secured to the planter apparatus and pivotally fastened to the top of the blades. A biasing unit is positioned intermediate the length of the blades and between them to expand the blades and keep the scraping blades in contact with the discs. The bracket unit is mounted on the planter apparatus in a configuration that will position the scraping edge near the outside of the discs and approximately perpendicular to the near edge of the discs. As the discs rotate, the scraping edges ride on the inside surface of both discs thereby removing debris that attaches to the discs as they rotate in the soil.

It is, therefore, a first object of the present invention to provide an apparatus for the removal of debris from the inside surface of the pair of planting discs.

A second object of the present invention is to provide a disc scraping apparatus which will not damage or misalign the planting discs.

The third object of the present invention is to provide a disc scraping apparatus which is economical to manufacture, easily serviced, and effective in use.

A further object of the present invention is to provide a disc scraping apparatus that will withstand long periods of use and will not require frequent adjustments.

Other objects, advantages, and novel features will become apparent when the following detailed description of the invention is considered in conjunction with the accompanying drawings.

DESCRIPTION OF THE PREFERRED EMBODIMENT

Figure 1:
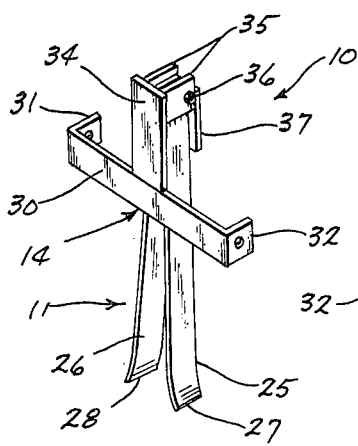
FIG. 1 is a perspective view illustrating the disc scraping apparatus.
Figure 2:
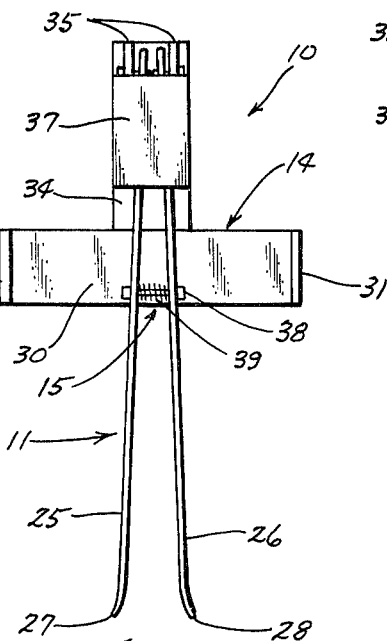
FIG. 2 is a front view thereof.
Figure 3:
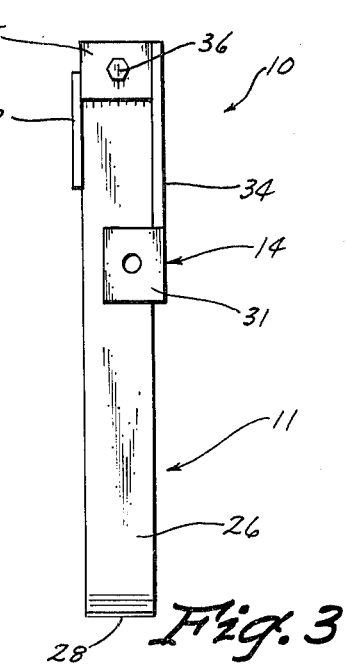
FIG. 3 is a side view thereof.
Figure 4:
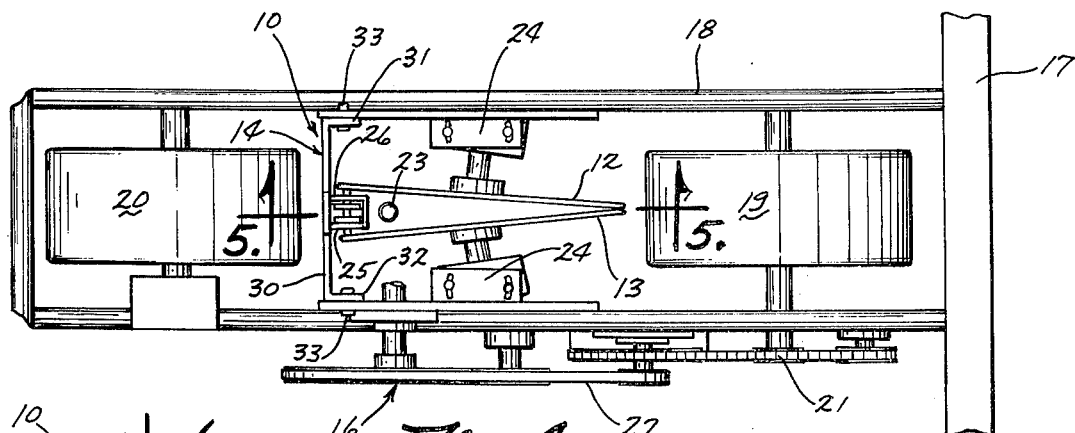
FIG. 4 is a top view thereof.

The disc scraping apparatus of this invention is indicated generally at 10 in FIGS. 1 and 4 and is used in combination with the planting unit 16. The disc scraping apparatus 10 is in physical contact with the pair of discs 12 and 13 (FIG. 4), thereby removing any foreign material that attaches to the discs 12 and 13 during normal use. The apparatus 10 comprises generally a blade unit 11, a bracket unit 14, and a biasing unit 15 (FIGS. 1–3).

The planter apparatus 16 (FIG. 4) is coupled to the tool bar of the tractor which is, in turn, fastened to the tractor (not shown). The planter apparatus 16 has an upper frame (not shown) and a lower frame 18 pivotally attached intermediate its ends to the upper frame. A pair of flat surfaced wheels 19 and 20 are mounted to the lower frame 18, one in the front portion and one in the rear portion thereof, and a pair of discs 12 and 13 are mounted side by side there between. The discs 12 and 13 and wheels 19 and 20 further are mounted along the longitudinal axis of both frames. A chain drive 21 connected to and driven by the front wheel 19 activates a pulley drive 22 which, in turn, activates a rotating seed mechanism (not shown). A tube 23 passing between the discs 12 and 13 carries the seed from the seed discharge mechanism and deposits it in an incision made by the discs 12 and 13 in the soil. The rear wheel 20 presses the soil over the incision with the seed therein. The mounting plates 24 couple the discs 12 and 13 to the lower frame 18 and provide a means of adjusting the position of the discs 12 and 13. The plates 24 position the discs 12 and 13 such that the lower front edges are close together and the rear upper edges are spaced apart in a diverging configuration. For a more detailed description of the planter apparatus, please refer to U.S. Pat. No. 3,886,875 entitled Planter Apparatus to Arnold E. Ernst, which is hereby incorporated by reference.

The blade unit 11 is comprised of two elongated scraping blades 25 and 26 (FIGS. 1–4 and 6). A scraping edge 27 and 28 is formed on each blade 25 and 26 respectively by slightly deflecting the bottom edge of each blade outwardly and grinding or otherwise deforming the outside edge so as to sharpen it.

The bracket unit 14 (FIGS. 1–6) includes a main support arm 30 extending perpendicular to the blades 25 and 26. The end units 31 and 32 of arm 30 extend at right angles to the arm 30 and parallel to the lower frame 18, thereby enabling them to be removably secured to the planter 16 by nut and bolt assembly 33. The back element 34 of the bracket unit 14 extends upward from arm 30 and midway the length of arm 30 and includes fingers 35 which are spaced apart and project outwards parallel to each other and perpendicular to back element 34. The blades 25 and 26 are pivotally secured to the bracket unit 14 by a nut and bolt assembly 36 which passes through finger 35. Cover plate 37 is rigidly secured to the front of the fingers 35 and extends downward, parallel to the back element 34 to prevent blades 25 and 26 from swinging forward.

The biasing unit 15 (FIGS. 2, 5 and 6) includes a threaded nut and bolt assembly 38 with a spring element 39 on the body of the bolt between the blades 25 and 26. The spring 39 exerts a constant outward force on the blades 25 and 26, thereby keeping them in a spaced apart relationship as shown in FIG. 2.

Figure 5:
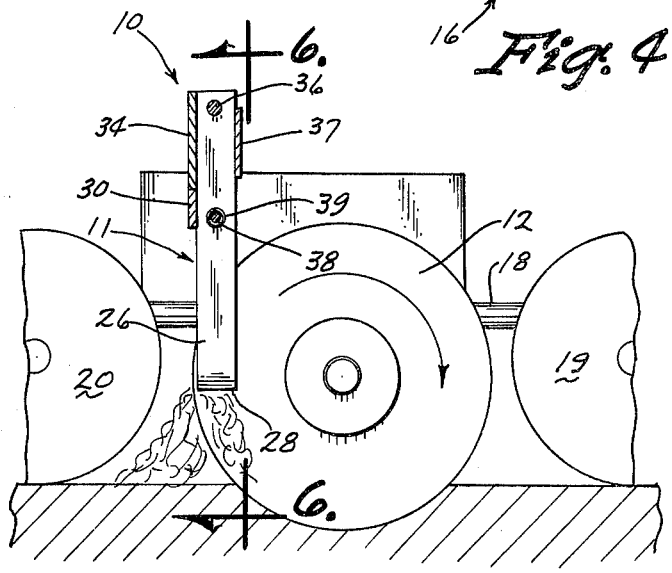
FIG. 5 is a cross-sectional view taken along lines 5—5 of FIG. 4.
Figure 6:
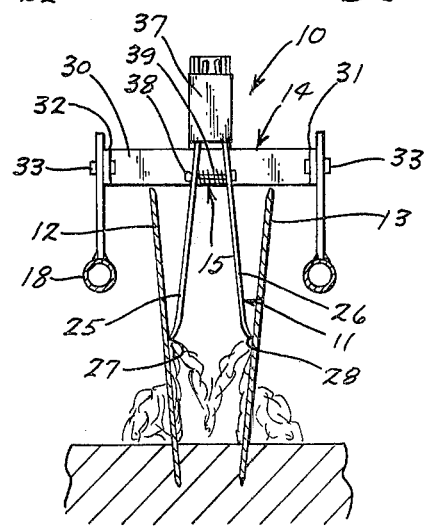
FIG. 6 is a cross-sectional end view taken along lines 6—6 of FIG. 5.

The bracket unit 14 with the blades 25 and 26, attached to it and the biasing unit 15 coupled to the blades 25 and 26, as described above, is inserted into the planter unit 16 as shown in FIGS. 4-6. The bracket unit 14 is secured to the planter unit 14 by nut and bolt assembly 33. Before the bracket unit 14 is rigidly secured within the planter unit 16, it is aligned such that the center of the region between the blades is midway the separation of the discs 12 and 13 at their coverging end. The biasing unit 15 then forces the blades 25 and 26 to flair outward and contact the discs 12 and 13. The bracket unit 14 is further positioned so that the blades 25 and 26 ride upon the outside portion of the discs 12 and 13 as shown in FIG. 5. This insures the best cleaning of the discs 12 and 13 as they rotate in a clockwise direction.

As the discs 12 and 13 rotate below the soil (FIG. 6), dirt, clay, etc., attach to them. With the blades positioned directly against the rear inside edge of the discs 12 and 13, the scraping edges 27 and 28 will dislodge the debris from the disc 12 and 13 thereby preventing their becoming clogged and interfering with their intended action with the ground surface.

Obviously, many modifications and variations of the above present invention are possible in light of the above teachings. It is therefore to be understood that, within the scope of the appended claims, the invention may be practiced otherwise than as specifically described.

I claim:

1. A planter apparatus of the type having a pair of discs for breaking the ground surface during the planting operation; the discs being positioned with their front lower portions close together for entry into the soil and their upper rear portions spaced apart from each other in a diverging configuration, the improvement being means for scraping the inside peripheral surfaces of the discs as they rotate, the scraping means comprising:

a bracket unit rigidly secured to the planter apparatus, said bracket unit including:
a back element;
a first finger element having one end thereof rigidly attached to said back element;
a second finger element having one end thereof rigidly attached to said back element, said second finger element being spaced from said first finger element;
a cover plate rigidly attached to the other ends of the first and second finger elements; and
openings disposed in said first and second finger elements;
a blade unit positioned between said discs, said blade unit including:
a first blade, said first blade being substantially flat and having an outwardly extending scraping edge on one end thereof, said first blade having an upper opening therein and a centrally located opening therein;
a second blade, said second blade being substantially flat and having an outwardly extending scraping edge on one end thereof, said second blade having an upper opening therein and a centrally located opening therein;
a first pin means having a longitudinal axis and extending through the openings in said first and second finger elements and extending through and slideably received in said upper openings in said first and second blades for allowing pivoting of said blades along axes perpendicular to and intersecting with the axis of said first pin means; and
biasing means for keeping said blade unit in contact with said discs as the discs rotate, including:
second pin means slideably received in said centrally located openings of the first and second blades;
a coil compression spring surrounding said second pin means and being disposed between said first and second blades for biasing said first and second blades apart; and
means attached to each end of said second pin means for limiting the distance that the first and second blades can be pushed apart.

2. The planter apparatus defined in claim 1 wherein said cover plate extends a substantial distance below said first pin means, said back element extends a substantial distance above and below said first pin means and said first and second blades extend above said first pin means, whereby said first and second blades are substantially prevented from rotating about the axis of the first pin means.

* * * * *